United States Patent [19]
Knapp et al.

[11] Patent Number: 5,928,595
[45] Date of Patent: Jul. 27, 1999

[54] METHOD OF MANUFACTURING A SEMICONDUCTOR COMPONENT

[75] Inventors: James H. Knapp; Cliff J. Scribner, both of Chandler; Albert J. Laninga, Sr., Tempe, all of Ariz.

[73] Assignee: Motorola, Inc., Schaumburg, Ill.

[21] Appl. No.: 08/934,797

[22] Filed: Sep. 22, 1997

Related U.S. Application Data

[63] Continuation of application No. 08/431,997, May 1, 1995, abandoned.

[51] Int. Cl.$^6$ .............................. B29C 45/02; B29C 45/14
[52] U.S. Cl. .................... 264/272.17; 264/276; 264/279; 264/328.9; 425/127; 425/129.1; 425/544; 425/572; 425/588
[58] Field of Search .................... 425/116, 127, 425/129.1, 544, 572, 573, 588; 264/328.9, 272.17, 272.11, 276, 279

[56] References Cited

U.S. PATENT DOCUMENTS

| | | | |
|---|---|---|---|
| 3,514,814 | 6/1970 | Mills ........................ | 425/572 |
| 4,370,122 | 1/1983 | Dannels et al. .................. | 425/588 |
| 4,779,835 | 10/1988 | Fukushima et al. .............. | 249/161 |
| 5,123,826 | 6/1992 | Baird ............................... | 425/129.1 |
| 5,197,183 | 3/1993 | Chia et al. ....................... | 29/827 |
| 5,252,051 | 10/1993 | Miyamoto et al. ................ | 425/116 |
| 5,344,296 | 9/1994 | Laninga ............................ | 425/121 |
| 5,372,758 | 12/1994 | Lundstrom et al. ............... | 425/129.1 |
| 5,454,705 | 10/1995 | Bauk ................................. | 425/129.1 |

FOREIGN PATENT DOCUMENTS

| | | | |
|---|---|---|---|
| 59 33838 | 2/1984 | Japan . | |
| 1-293523 | 11/1989 | Japan ................................ | 425/544 |

*Primary Examiner*—Harold Pyon
*Assistant Examiner*—Joseph Leyson
*Attorney, Agent, or Firm*—George C. Chen

[57] ABSTRACT

A method of manufacturing a semiconductor component includes forming a vertical side seal for a runner in a first mold plate by mating a protrusion of the first mold plate with a protrusion of a second mold plate. As an encapsulating material is forced through the runner, the vertical side seal prevents an encapsulating material from leaking out of the edge of the runner.

7 Claims, 4 Drawing Sheets

5,928,595

METHOD OF MANUFACTURING A SEMICONDUCTOR COMPONENT

This application is a continuation-in-part of prior application Ser. No. 08/431,997, filed May 1, 1995, now abondoned.

BACKGROUND OF THE INVENTION

This invention relates, in general, to encapsulating a workpiece, and more particularly, to an apparatus for and a method of transferring an encapsulating material to a mold cavity.

Packaging protects semiconductor devices from deleterious environmental effects including moisture, corrosion, and mechanical stresses and damage. A semiconductor device and electrically coupled leadframe are placed in a cavity of a first plate of a mold apparatus for the packaging process. When the mold apparatus is closed, the cavity is sealed by pressing the first plate and a second plate tightly against the leadframe around a perimeter of the cavity. An encapsulation material in a reservoir or pot of the mold apparatus is liquefied, forced from the pot through a groove or runner and into the cavity, and hardened to encapsulate the semiconductor device.

During the packaging process, the encapsulation material leaks from the runner and forms undesired thin sheets or webs, known as flash, on the molding plates themselves and on ends of electrical leads of the leadframe outside the cavity. Removal of the undesired flash is both time consuming and expensive. The removal process can destroy the electrical leads rendering the packaged semiconductor device useless and can also destroy the high-priced molding plates.

To prevent the deleterious formation of flash, the pot, the runner, and the cavity containing the semiconductor device must all be properly sealed during the packaging process. Extra force is applied in the runner region of the first and second mold plates to ensure proper sealing of the runner. However, flash formation still originates from the runner when packaging leadframes that are too thick. When packaging leadframes that are too thin, flash formation originates from the cavity. Therefore, different sets of molding plates are used for packaging leadframes of different thicknesses.

Due to the high temperatures of the packaging process and the alignment precision required for the molding assembly, changing the molding plates for leadframes of different thicknesses is a time consuming process. Due to the extreme precision required for machining the molding plates which cost approximately $85,000 per set, the semiconductor device packaging process is an expensive one to maintain, especially when flash problems are common or when leadframes of different thicknesses need to be packaged. Furthermore, the actual thickness of a leadframe for a specified dimension will still vary, and thus the use of different molding plates does not provide a panacea for the problem of flash formation.

Accordingly, a need exists for eliminating flash formation resulting from the leakage of encapsulation material from the runner and from the cavity during the semiconductor device packaging process. Additionally, a need also exists for reducing the capital cost of maintaining different sets of molding plates for packaging leadframes of different thicknesses. The method and apparatus for satisfying these needs should be more economical and less time consuming compared to the old methods and apparatuses.

DETAILED DESCRIPTION OF THE DRAWINGS

Figure 1:
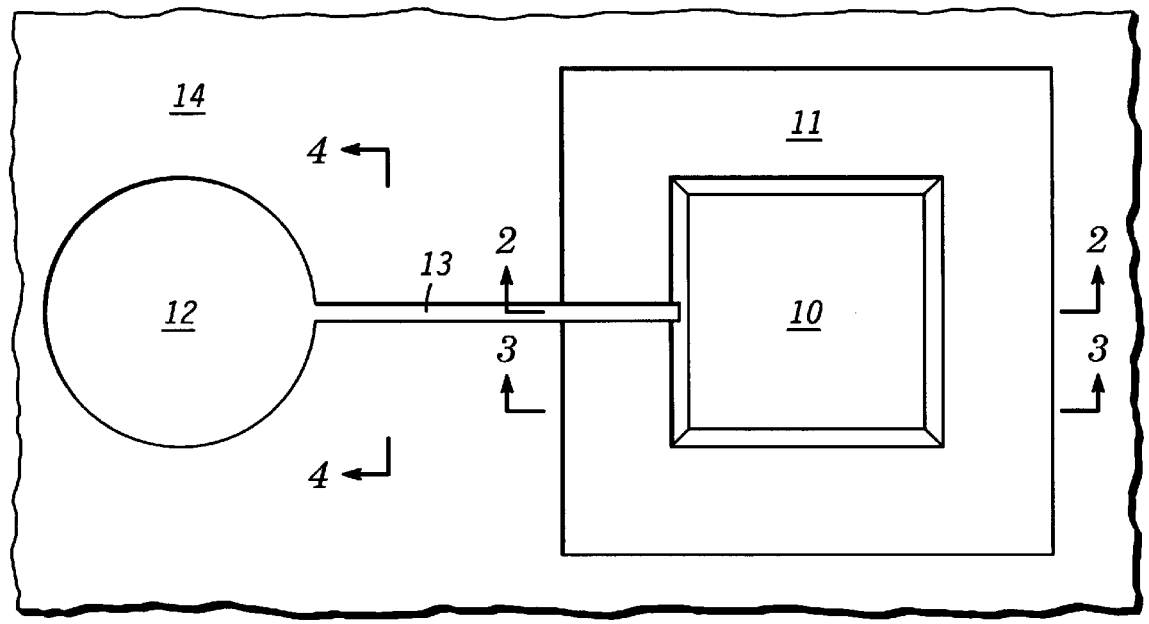
FIG. 1 is a top-down view of a first plate of a prior art mold apparatus.

A top-down view of plate 14 of prior art mold apparatus 36 is depicted in FIG. 1. Plate 14 contains reservoir or pot 12, recess 11, mold cavity 10, and groove or runner 13 connecting mold pot 12 to mold cavity 10. An example of a configuration of mold pot 12 is described in U.S. Pat. No. 5,123,826 which is hereby incorporated by reference. An encapsulating material comprising solid epoxy or silicon compounds is deposited in mold pot or pot 12. A semiconductor device is mounted on a semiconductor leadframe and is positioned in mold cavity or cavity 10 which is sized and shaped to form a packaged semiconductor device. Recess 11 is sized and shaped to hold a portion of the semiconductor leadframe on which the semiconductor device is not mounted. Specifically, recess 11 holds external electrical leads of the packaged semiconductor device which are not to be covered by the encapsulating material. Runner 13 serves as a path or route to guide the encapsulating material from pot 12 to cavity 10 for joint encapsulation of the semiconductor device and the leadframe. Dimensions of cavity 10, recess 11, pot 12, and runner 13 are commonly known in the art.

Figure 2:
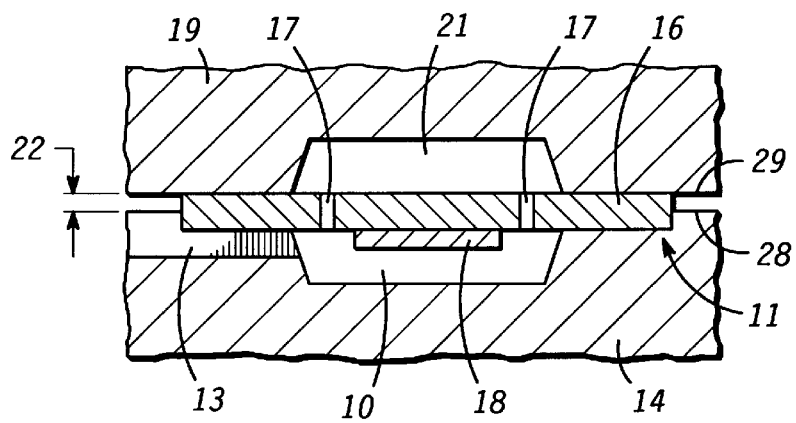
FIGS. 2–4 are partial cross-sectional views of the first plate of FIG. 1, and additionally contain a semiconductor device, a leadframe, and a second plate of the prior art mold apparatus.

FIG. 2 shows a partial cross-sectional view of cavity 10, recess 11, and runner 13 of plate 14 shown in prior art FIG. 1. In addition to plate 14, FIG. 2 also depicts plate 19 of mold apparatus 36, semiconductor circuit or device 18, and leadframe 16. Semiconductor device 18 is fabricated using conventional semiconductor manufacturing processes, as known in the art, and is electrically coupled to and mounted on leadframe 16. The mounting and electrical coupling is accomplished using conventional methods known in the art including die bonding, wire bonding, flip chip bonding, and the like. Leadframe or workpiece 16 is a conventional leadframe used for a dual-in-line package, a quad flat pack, a small outline integrated circuit, a flip chip package, a surface mount package, or the like.

Prior to packaging, a heatsink (not shown) can be attached to leadframe 16 on an opposite side of leadframe 16 from semiconductor device 18. In this configuration, the heatsink can be contained by cavity 21 of plate 19 while semiconductor device 18 is contained by cavity 10 of plate 14. Alternatively, semiconductor device 18 and leadframe 16 can also be positioned in mold apparatus 36 such that semiconductor device 18 is contained in cavity 21 instead of cavity 10 as shown in FIG. 2.

Plates 14 and 19 press tightly against leadframe 16 in the region of recess 11. This tight pressure seals cavities 10 and 21 of plates 14 and 19, respectively, to form a packaging cavity in which semiconductor device 18 is enclosed and will be encapsulated. Extra pressure is applied to plates 14 and 19 in the region of runner 13 to ensure it is properly sealed during the packaging process.

Heat and pressure are used to liquefy encapsulating material which is forced through runner 13 from pot 12 to cavity 10. Leadframe 16 has holes 17 through which the fluid molding material travels from cavity 10 to cavity 21. The encapsulating material cannot leak out of cavities 10 and 21 due to the pressure of plates 14 and 19 in the region of recess 11 which tightly seals cavities 10 and 21. After cavities 10 and 21 are filled with the liquefied encapsulating material, the encapsulating material is hardened to jointly package semiconductor device 18 and leadframe 16.

When leadframe 16 is placed in recess 11, the exposed surface of leadframe 16 should be flush with surface 28 of plate 14 such that surface 29 of plate 19 can contact surface 28. As described below, the contact of surfaces 28 and 29 seals runner 13. However, as shown in FIG. 2, when leadframe 16 is too thick to be fully contained in recess 11, surfaces 28 and 29 will not contact each other, and gap 22 will exist.

Figure 3:
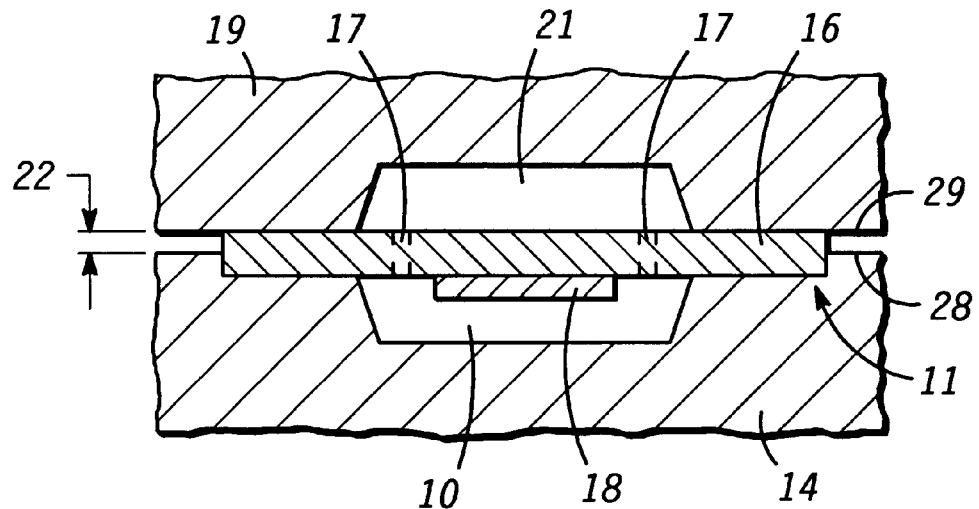

Gap 22 can also be seen in FIG. 3 which depicts a different partial cross-sectional view of prior art FIG. 1 as compared to FIG. 2. The cross-section of FIG. 3 does not include runner 13. FIG. 3 shows that when leadframe 16 is too thick, cavities 10 and 21 are still tightly sealed. As known in the art, dam bars in the portion of leadframe 16 which is contained by recess 11 aid in the sealing of cavities 10 and 21.

Figure 4:
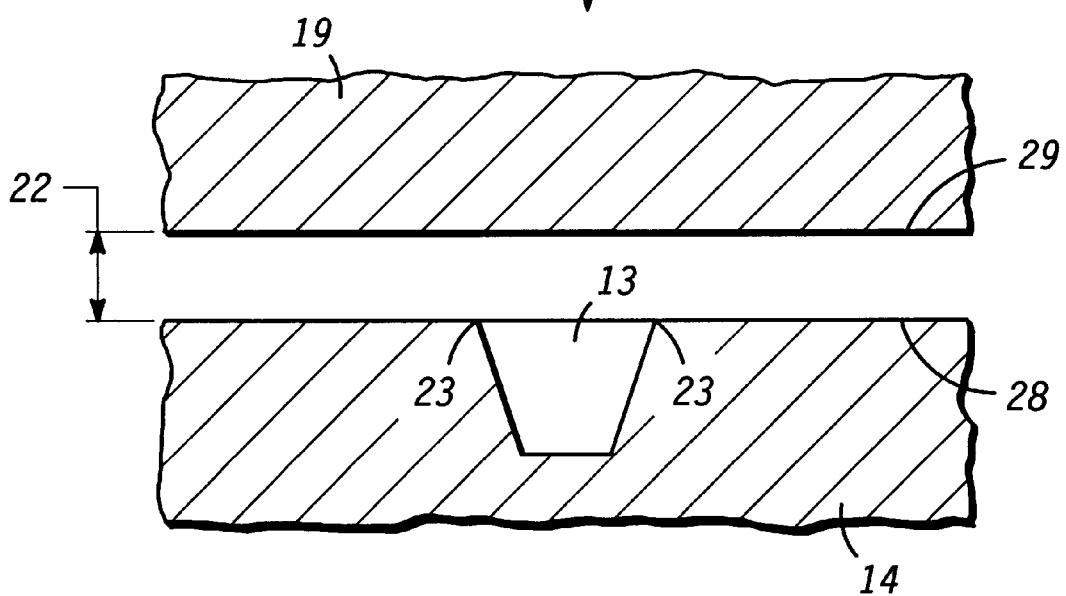

In FIG. 4, the portion of gap 22 which exists above runner 13 is illustrated in partial cross-sectional view of prior art FIG. 1. When leadframe 16 is too thick, runner 13 is not tightly sealed by surfaces 28 and 29 of plates 14 and 19, respectively. Therefore, the liquefied encapsulating material can flow out of runner 13 from edge 23 and form detrimental flash on areas of leadframe 16 and plates 14 and 19.

If leadframe 16 is too thin (not shown), when leadframe 16 is placed in recess 11, the exposed surface of leadframe 16 will not be flush with surface 28 of plate 14. Instead, a small recess will still exist in the region of recess 11. When plates 14 and 19 are brought together to compress leadframe 16, surfaces 28 and 29 will contact each other, but surface 29 of plate 19 will not contact leadframe 16. Therefore, cavities 10 and 21 will not be sealed, and the liquefied encapsulating material can flow out of cavity 21 and into recess 11 which will undesirably encapsulate the electrical leads of leadframe 16 and destroy the product. When leadframe 16 is too thin, runner 13 will be properly sealed to prevent the encapsulating material from leaking out of edges 23 of runner 13.

Plates 14 and 19 are composed of conventional molding plate materials including a high alloy steel comprising carbon, chromium, molybdenum, tungsten, and vanadium. Plates 14 and 19 are machined using conventional fabrication techniques as known in the art. The machining of plates 14 and 19 requires extreme precision to ensure proper sealing of runner 13 and cavities 10 and 21, and it is the extreme precision requirement which produces the expensive prices of mold apparatus 36.

Figure 5:
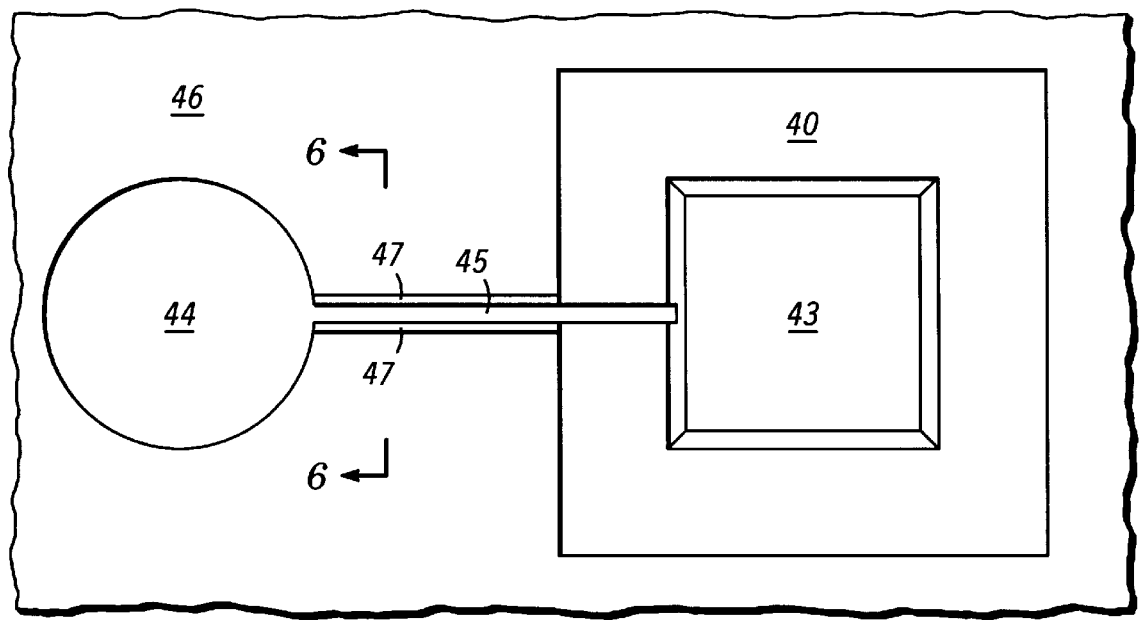
FIG. 5 is a top-down view of a first plate of a mold apparatus in accordance with the present invention.

In the present invention, as depicted in top-down view of FIG. 5, mold apparatus 41 uses mold plate 46 which has mold cavity 43 for containing semiconductor device 18 and leadframe 16, recess 40 for containing electrical leads of leadframe 16, pot 44 for containing the encapsulating material, and runner 45 for guiding the encapsulating material from pot 44 to mold cavity or cavity 43. Mold plate or plate 46 can contain multiple runners, recesses, and cavities connected to pot 44. Similarly, plate 46 can contain multiple pots. Plate 46 also contains protrusions 47 which aid in prohibiting the liquefied encapsulating material from bleeding out of or escaping from runner 45 during transferal of the encapsulating material from pot 44 to cavity 43 through runner 45.

Figure 6:
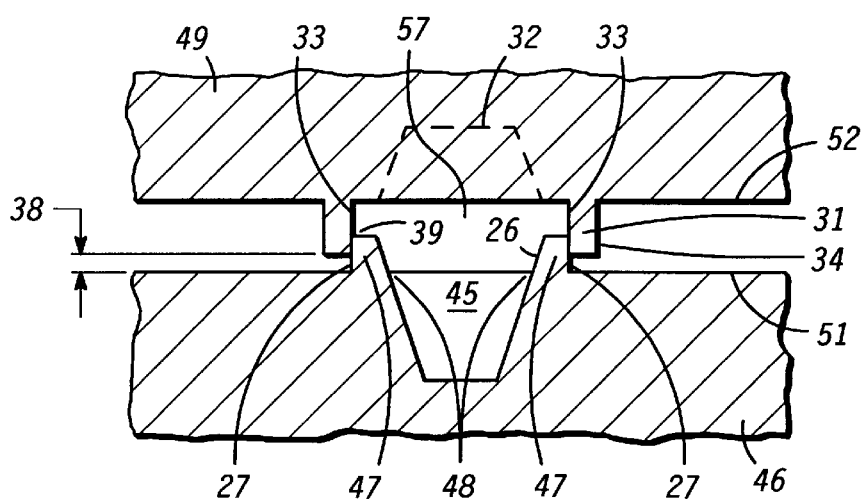
FIG. 6 is a partial cross-sectional view of the first plate of FIG. 5, but with a semiconductor device, a leadframe, and a second plate of the mold apparatus in accordance with the present invention.

In FIG. 6, a partial cross-section of FIG. 5 depicts a region of plate 46 containing runner 45. Plate or mold plate 46 contains runner 45 which has edges 48 along surface 51 of mold plate 46. Adjacent to edges 48, protrusions 47 extend away from surface 51. Alternatively, protrusions 47 can be a fixed distance away from edges 48. Protrusions 47 have inner surfaces 26 which face toward runner 45 and outer surfaces 27 which face away from runner 45.

FIG. 6 additionally contains a cross-section of mold half 49 of mold apparatus 41. Mold half or plate 49 contains protrusions 31 which extend from surface 52 of plate 49. Protrusions 31 have inner surfaces 33 which face toward runner 45 when protrusions 31 are mated with protrusions 47. Protrusions 31 have outer surfaces 34 which face away from runner 45 when mated with protrusions 47.

Plates 46 and 49 and protrusions 47 and 31 are fabricated using the same materials and manufacturing process as are used for fabricating plates 14 and 19. While protrusions 47 and 31 can be fabricated separately from plates 46 and 49 and attached after individual fabrication, protrusions 47 and 31 are part of the original fabrication of plates 46 and 49, respectively, in the preferred embodiment of the present invention.

Protrusions 47 and 31 are configured such that when plates 46 and 49 are mated and pressed against leadframe 16 held in recess 40, outer surfaces 27 of protrusions 47 face inner surfaces 33 of protrusions 31. The mating configuration of outer surfaces 27 and inner surfaces 33 comprise vertical side seal 39 for runner 45. Surfaces 27 and 33 are not required to physically contact each other to form vertical side seal 39. In fact, a space of approximately 0.01 mm to 0.09 mm can exist between surfaces 27 and 33 and still properly maintain vertical side seal 39. The appropriate size of the space depends upon the viscosity of the liquefied encapsulating material, the pressure used during the packaging process, and the particle size of the encapsulating material. The use of a higher pressure, a more viscous encapsulating material, or a smaller particle sized encapsulating material requires a smaller space or a tighter tolerance for proper formation of vertical side seal 39. The use of vertical side seal 39 precludes the necessity of applying extra pressure to plates 46 and 49 in the region of runner 45 to ensure that runner 45 is properly sealed during transferal of the encapsulating material from pot 44 to cavity 43.

Protrusions 47 and 31 are each approximately 1 mm wide and are of a sufficient height to properly maintain vertical side seal 39 for a range of different thicknesses for different leadframes. In this configuration, mold apparatus 41 eliminates the problem of flash formation from edges 48 or runner 45 when leadframe 16 is too thick. As shown in prior art FIG. 4, if leadframe 16 is too thick for recess 40, runner 45 will not be properly sealed when protrusions 47 and 31 are not used. However, as shown in FIG. 6, mating protrusions 47 and 31 maintain vertical side seal 39 and enable mold apparatus 41 to be used for encapsulating different leadframes of different thicknesses. For a thicker leadframe 16, protrusion 31 will overlap a smaller portion of protrusion 47, and for a thinner leadframe 16, protrusion 31 will overlap a larger portion of protrusion 47. Vertical side seal 39 of FIG. 6 can be alternatively embodied with outer surfaces 34 of protrusions 31 mating with inner surfaces 26 of protrusions 47.

Gap 38 of FIG. 6 exists between the distal ends of protrusions 31 and surface 51. Regardless of the thickness of leadframe 16, gap 38 should be present during the packaging process of semiconductor device 18. To ensure the existence of gap 38 when packaging a leadframe of a specified thickness, recess 40 of mold apparatus 41 can be more shallow than recess 11 of mold apparatus 36 in the prior art. When leadframe 16 is placed in recess 40, a more shallow recess 40 will ensure that the exposed surface of leadframe 16 will not be flush with, but will protrude from, surface 51. With the existence of gap 38, the problem of flash originating from cavity 43 while encapsulating a different leadframe which is too thin is eliminated. The prior art process of flash originating from a mold cavity due to a thin leadframe is previously explained in the paragraph after the description of FIG. 4.

FIG. 6 depicts at least one protrusion 47 on either side of runner 45 and a similar number of protrusions on plate 49 to mate with the protrusions of plate 46 to form vertical side seal 39. A plurality of seals 39 can be formed by having a plurality of protrusions 47 on either side of runner 45 with a corresponding plurality of protrusions 31 of plate 49 interdigitated between the plurality of protrusions 47 on plate 46. This alternative embodiment creates a plurality of seals 39 which provide a tighter enclosure for runner 45.

Another alternative embodiment of FIG. 6 uses slot 57 to form vertical side seal or seal 39. In this alternative embodiment, surface 52 of plate 49 is flush with distal ends of protrusions 31, thus eliminating protrusions 31. Slot 57 has sidewalls 33 which mate with outer surfaces 27 of protrusions 47 to form seal 39. Therefore, gap 38 exists between surface 51 of plate 46 and adjusted surface 52 of plate 49.

Figure 7:
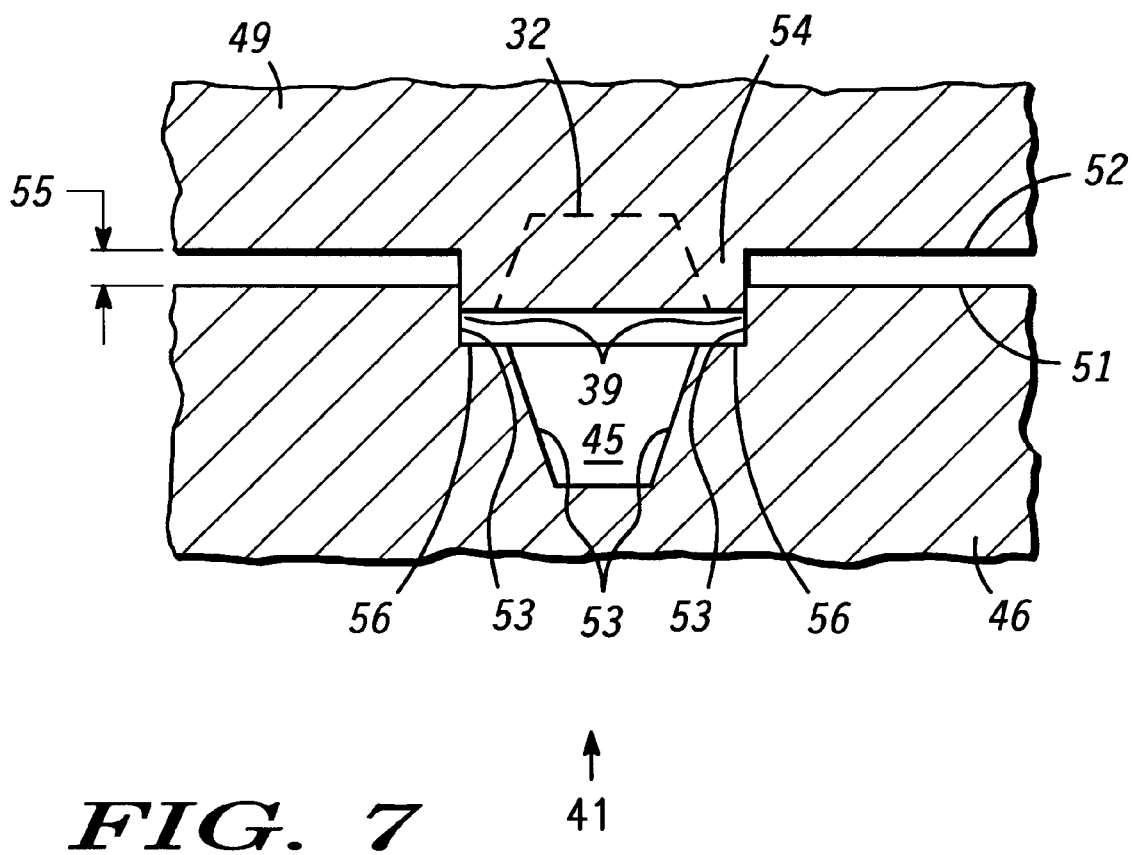
FIG. 7 is an alternative embodiment of the cross-section shown in FIG. 6.

FIG. 7 depicts an alternative embodiment of vertical side seal 39 shown in FIG. 6. Surface 51 of plate 46 contains runner 45 having sidewalls 53. Surface 52 of plate 49 contains protrusion 54 which faces and mates with sidewalls 53 to form vertical side seal 39. Sidewalls or sides 53 can be configured to include surface 56 which conforms to the distal end of protrusion 54. As known in the art, when protrusion 54 is adjacent to surface 56, a higher pressure is required for the encapsulating material to escape from runner 45 through vertical side seal 39. Gap 55 exists between surfaces 51 and 52 of plate 46 and 49, respectively. Similar to gap 38 of FIG. 6, the existence of gap 55 in FIG. 7 eliminates flash formation originating from cavity 43 due to leadframe 16 being too thin.

As shown in both FIGS. 6 and 7 by the dotted lines, runner 32 can exist in plate 49 to combine with runner 45 to create single path for the encapsulating material. Similarly, runner 32 can be offset from runner 45 to form a separate path from runner 45, and runner 32 can use its own protrusions to create its own vertical side seal.

It is to be understood that the use of vertical side seal 39 can also be applied to other encapsulating or molding applications besides leadframes and semiconductors devices. Therefore, workpiece 16 can be an object other than a leadframe.

Therefore, in accordance with the present invention, it is apparent there has been provided an improved mold apparatus for packaging a semiconductor device which overcomes the disadvantages of the prior art. By using a vertical side seal for the runner, the present invention eliminates the need for multiple mold plates for encapsulating leadframes of different thicknesses. Using a single set of mold plates is more economical and increases the packaging process throughput since time is not wasted while waiting for the mold plates to cool prior to replacing them with a different set of mold plates for encapsulating a leadframe of a different thickness. Additionally, since leadframes of a specified thickness will vary, the present invention compensates for the thickness variation by using the vertical side seal. In doing so, flash from the runner is eliminated when the leadframe is too thick, and flash from the cavity is eliminated when the leadframe is too thin. With the elimination of flash, product yield and throughput is higher, the mold plates will not require cleaning to remove flash, and the mold plates will not be damaged by the flash removal process.

We claim:

1. A method of manufacturing a semiconductor component comprising:

providing a first mold plate having a first surface, a runner in the first surface, a first protrusion extending from the first surface and away from the runner, a mold cavity, and a mold pot, wherein the first protrusion has a first inner surface which faces toward the runner and a first outer surface which faces away from the runner, and wherein the runner has an edge on the first surface;

positioning a semiconductor device and a leadframe in the mold cavity;

mating a second mold plate to the first mold plate, wherein the second mold plate has a second surface and a second protrusion extending from the second surface, and wherein the second protrusion has a second inner surface and a second outer surface;

forming a vertical side seal for the runner by mating the first and second protrusions while mating the first and second mold plates;

depositing an encapsulating material in the mold pot;

liquefying the encapsulating material;

transferring the encapsulating material from the mold pot, through the runner, and into the mold cavity;

using the vertical side seal to prevent the encapsulating material from leaking out the edge of the runner; and hardening the encapsulating material in the mold cavity.

2. The method according to claim 1 wherein forming the vertical side seal further comprises mating the second inner surface of the second protrusion to the first outer surface of the first protrusion.

3. The method according to claim 1 further comprising:

maintaining the vertical side seal during the depositing, liquefying, transferring, preventing, and hardening steps when the leadframe has a first thickness; and maintaining the vertical side seal while repeating the depositing, liquefying, transferring, preventing, and hardening steps when the leadframe has a second thickness different from the first thickness.

4. The method according to claim 1 wherein the step of forming the vertical side seal includes providing the vertical side seal substantially parallel to the runner.

5. The method according to claim 1 wherein the step of providing the first mold plate includes providing the inner surface of the first protrusion contiguous with a sidewall of the runner.

6. The method according to claim 1 wherein the step of providing the first mold plate includes providing the inner surface of the first protrusion offset from the sidewall of the runner.

7. The method according to claim 1 wherein forming the vertical side seal further comprises mating the second outer surface of the second protrusion to the first inner surface of the first protrusion.

\* \* \* \* \*